United States Patent
Fetzmann et al.

(10) Patent No.: US 7,848,883 B2
(45) Date of Patent: Dec. 7, 2010

(54) METHOD AND DEVICE FOR DETERMINING THE GROUND POSITION OF A MOBILE OBJECT, IN PARTICULAR AN AIRCRAFT ON AN AIRPORT

(75) Inventors: Fabien Fetzmann, Cugnaux (FR); Pierre Coldefy, Toulouse (FR); Thierry Malaval, Toulouse (FR); Stéphane Collins, Toulouse (FR)

(73) Assignee: Airbus France, Toulouse (FR)

( * ) Notice: Subject to any disclaimer, the term of this patent is extended or adjusted under 35 U.S.C. 154(b) by 326 days.

(21) Appl. No.: 11/994,987

(22) PCT Filed: Jul. 12, 2006

(86) PCT No.: PCT/FR2006/001692

§ 371 (c)(1),
(2), (4) Date: Jan. 7, 2008

(87) PCT Pub. No.: WO2007/010116

PCT Pub. Date: Jan. 25, 2007

(65) Prior Publication Data

US 2009/0128405 A1    May 21, 2009

(30) Foreign Application Priority Data

Jul. 18, 2005    (FR) .................................. 05 07567

(51) Int. Cl.
*G01C 21/00* (2006.01)
(52) U.S. Cl. ............................ 701/220; 701/3; 342/461
(58) Field of Classification Search ............... 701/3, 701/220; 342/461
See application file for complete search history.

(56) References Cited

U.S. PATENT DOCUMENTS

| 5,146,417 | A | * | 9/1992 | Watson ........................ 702/85 |
| 5,539,645 | A | * | 7/1996 | Mandhyan et al. ........... 701/119 |
| 5,541,845 | A | * | 7/1996 | Klein .......................... 701/207 |

(Continued)

OTHER PUBLICATIONS

IEEE publication Integrated INS/GPS system for high precision navigation applications ISBN: 0-7803-1435-2 that appears in Position Location and Navigation Symposium, 1994., IEEE, Publication Date: Apr. 11-15, 1994 On pp. 310-313.*

(Continued)

*Primary Examiner*—Jack Keith
*Assistant Examiner*—Rami Khatib
(74) *Attorney, Agent, or Firm*—Dickinson Wright PLLC

(57) ABSTRACT

The invention concerns a device (1) comprising means (2) for emitting periodically position data, means (3) for emitting inertial data, means (4) for determining the position of the mobile object upon each position data emission based thereon, and means (5) for determining the position of the mobile object between two successive emissions of position data, the time interval between two successive emissions being divided into time ranges of equal duration separated by intermediate times, the latter means (5) determining for each current intermediate time the position of the mobile object, based on its position at the preceding intermediate time and based on its movement during the time range delimited by the current and preceding intermediate times, movement which is calculated by means of the inertial date.

10 Claims, 1 Drawing Sheet

U.S. PATENT DOCUMENTS

| | | | |
|---|---|---|---|
| 5,787,384 A * | 7/1998 | Johnson | 701/216 |
| 7,274,504 B2 * | 9/2007 | Crane et al. | 342/357.14 |
| 7,477,986 B1 * | 1/2009 | Young | 701/207 |
| 7,490,008 B2 * | 2/2009 | Draganov | 701/214 |
| 2004/0006424 A1 * | 1/2004 | Joyce et al. | 701/207 |
| 2004/0107072 A1 | 6/2004 | Dietrich | |
| 2004/0239560 A1 | 12/2004 | Coatantec | |
| 2007/0004413 A1 * | 1/2007 | Mahajan et al. | 455/441 |

OTHER PUBLICATIONS

International Search Report dated Nov. 27, 2006.

W. Sohne, et al., "Integrated INS/GPS System for High Precision Navigation Applications," Position Location and Navigation Symposium, 1994, IEEE, Apr. 11-15, 1994, pp. 310-313.

D. Hohman, et al., "GPS Roadside Integrated Precision Positioning System," IEEE, Mar. 13, 2000, pp. 221-230.

* cited by examiner

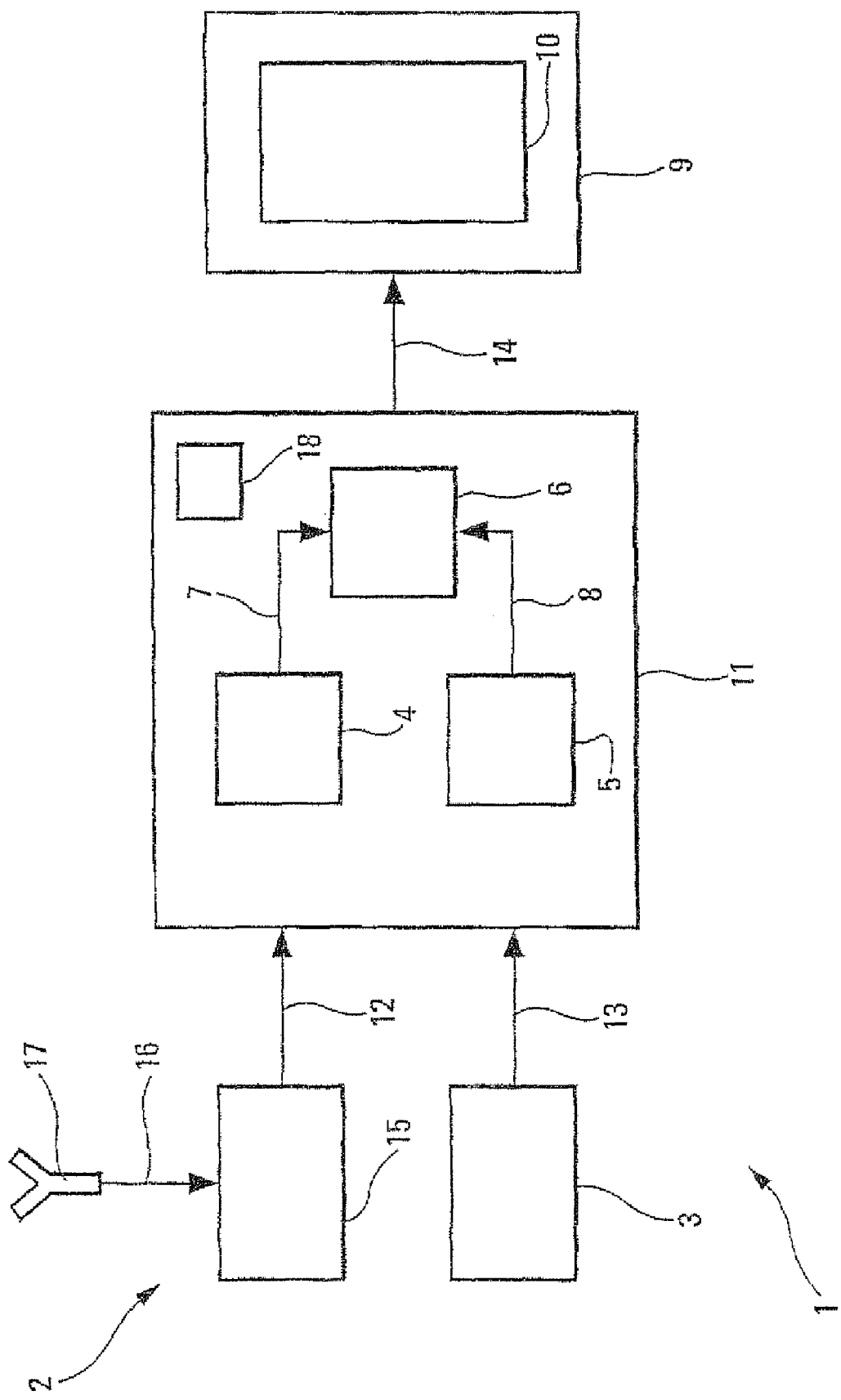

METHOD AND DEVICE FOR DETERMINING THE GROUND POSITION OF A MOBILE OBJECT, IN PARTICULAR AN AIRCRAFT ON AN AIRPORT

TECHNICAL FIELD OF THE INVENTION

The present invention relates to a method and a device for determining the ground position of a craft, in particular of an aircraft on an airport.

BACKGROUND OF THE INVENTION

Within the framework of an airport navigation function (which makes it possible to display on a screen of the flight deck of an aircraft an airport map on which the current position of the aircraft is indicated), it is necessary to ascertain the exact position of the aircraft when it is situated on the ground. The accuracy and the rate of refreshing of this position are decisive parameters for ensuring the credibility of the information displayed, with respect to the exterior markers visible by the pilot of the aircraft. The availability of this position, together with the appropriate performance, must be guaranteed for all the airport surfaces capable of receiving aircraft equipped with such a device, thereby assuming that the position is determined without relying solely on the use of possible equipment available on the ground to improve the calculation, given that such equipment is not envisaged on all airports.

To determine the position of the aircraft, use is generally made of a reception assembly which is associated with a satellite positioning system, in particular of GPS type ("Global Positioning System"), for example Navstar, Galileo, GNSS, GLONASS. This reception assembly comprises in a standard manner a reception antenna which is mounted on the roof of the aircraft, as well as a receiver which is linked to this antenna and which generates aircraft position data, on the basis of signals detected by said antenna. However, such a positioning assembly delivers the position data, that is to say information about the position of the aircraft, for in-flight navigation requirements only once a second, this being insufficient for airport navigation requirements, since such a delivery frequency does not make it possible to retrieve the displacements of the aircraft in a satisfactory manner.

SUMMARY OF THE INVENTION

The present invention is aimed at remedying these drawbacks. It relates to a method for determining, in an accurate manner and with a high refresh rate, the ground position of an arbitrary craft, and in particular of an aircraft which is situated on an airport.

For this purpose, according to the invention, said method according to which use is made of position data emitted in a periodic manner as well as inertial data, is noteworthy in that:

A/ at each emission of position data, these position data are used to determine the position of the craft; and B/ between two successive emissions of position data, said inertial data are taken into account, and:

a) the time gap between these two successive emissions is divided into a plurality of timespans of the same duration, delimited by intermediate times;

b) at each of said intermediate times, an inertial speed of the craft is determined on the basis of the corresponding inertial data;

c) for each timespan, the average of the inertial speeds of the two intermediate times delimiting this timespan is calculated, and the ground displacement of the craft during said timespan is deduced therefrom; and d) for each intermediate time, the position of the craft is determined on the basis of its position at the previous intermediate time and on the basis or its displacement during the timespan delimited by these two corresponding intermediate times, current and previous.

Thus, by virtue of the invention, the position of the craft is determined at a frequency which is higher than the frequency of emission of the position data, thereby making it possible in particular to satisfy the requirement of a high rate of refreshing of the position of an aircraft within the framework of airport navigation.

The present invention takes account of the fact that the position data (which are preferably data generated by a receiver which is mounted on the craft and which cooperates with a standard satellite positioning system, for example of GPS type, are the most accurate available data. So, these position data are used to determine the position of the craft each time that they are emitted (step A/). Moreover, to obtain information about the position of the craft between two successive emissions of such position data, the inertial data are taken into account, which are preferably data generated by an inertial platform of said craft (step B/). The position of the craft obtained on the basis of said inertial data is admittedly less accurate (in general) than that obtained on the basis of the position data, but it is emitted at a much higher frequency and therefore makes it possible to fill in the absence of information between two emissions of position data.

The present invention applies to any type of craft moving on the ground and comprising means of arbitrary type which are capable of generating position data and inertial data.

In a first simplified embodiment, in steps B/c) and B/d), the position of the craft is determined with the aid of the following expressions:

$$\begin{cases} x_{i+1} = x_i + [(Vx_{i+1} + Vx_i) \cdot dt]/2 \\ y_{i+1} = y_i + [(Vy_{i+1} + Vy_i) \cdot dt]/2 \end{cases}$$

in which:

$x_{i+1}$ and $y_{i+1}$ are the coordinates in a horizontal plane of said position of the craft at an intermediate time $t_{i+1}$;

$x_i$ and $y_i$ are the coordinates in the horizontal plane of said position of the craft at a previous intermediate time $t_i$;

$Vx_{i+1}$ and $Vy_{i+1}$ are the coordinates in the horizontal plane of the inertial speed of the craft at the intermediate time $t_{i+1}$;

$Vx_i$ and $Vy_i$ are the coordinates in the horizontal plane of the inertial speed of the craft at the intermediate time $t_i$; and dt is the duration of the timespan.

Furthermore, in a second embodiment making it possible to correct a possible error due to a slow drift of an inertial platform used if appropriate to generate the inertial data, in steps B/c) and B/d), the position of the craft is determined with the aid of the following expressions:

$$\begin{cases} x_{i+1} = x_i + [(vx_{i+1} + vx_i) \cdot dt]/2 \\ y_{i+1} = y_i + [(vy_{i+1} + vy_i) \cdot dt]/2 \\ vx_{i+1} = vx_i + (Vx_{i+1} - Vx_i) \\ vy_{i+1} = vy_i + (Vy_{i+1} - Vy_i) \end{cases}$$

in which, in addition to the aforesaid parameters, $vx_i$ and $vy_i$ are calculated speeds which are adjusted in regard to the speed of a reception antenna associated with the aforesaid receiver and used to generate the position data, at each emission of said position data.

Preferably, said inertial data correspond directly to inertial speeds. However, in a particular embodiment, said inertial data can also correspond to accelerations which are used to determine said inertial speeds. This makes it possible in particular to increase the frequency of calculating the position of the craft, since the accelerations are delivered at a higher frequency than the inertial speeds. In this case, the accelerations are used to perform an inertial extrapolation between two successive items of inertial speed information.

In a particular embodiment, at each emission of position data:
- a first position of the craft is determined on the basis of the inertial data, in accordance with the aforesaid step B/;
- the deviation is calculated between this first position and a second position obtained with the aid of said emitted position data; and
- the position of the craft is given by:
    - said first position, if the deviation thus calculated is greater than or equal to a first predetermined value and is less than a second predetermined value; and
    - said second position, if said deviation is less than said first predetermined value.

The latter embodiment makes it possible to monitor and if appropriate to filter possible errors of position data of limited duration (predetermined limit).

Furthermore, advantageously, in a following step C/, a map illustrating the environment of the craft (for example an airport map) is displayed on a viewing screen, which map is furnished with a symbol indicating the position of said craft as determined in steps A/ and B/d).

In this case, advantageously:
- accuracy information relating to the accuracy of said position data are collected;
- a potential position error of the craft is determined on the basis of this accuracy information; and
- a zone illustrating said potential position error of the craft is highlighted on said map around said symbol.

The present invention also relates to an onboard device for determining the ground position of an arbitrary craft, in particular of an aircraft moving on an airport.

According to the invention, said device of the type comprising:
- first means for emitting position data in a periodic manner; and
- second means for emitting inertial data, is noteworthy in that it comprises, moreover:
- third means for determining the position of the craft at each emission of position data, on the basis of said position data; and
- fourth means for determining the position of the craft on the basis of the inertial data, between two successive emissions of position data, the time gap between two successive emissions being divided into a plurality of timespans of the same duration separated by intermediate times, said fourth means comprising:
    - means for determining, at each of said intermediate times, an inertial speed on the basis of the corresponding inertial data;
    - means calculating, for each timespan, the average of the inertial speeds of the two intermediate times delimiting this timespan and deducing therefrom the ground displacement of the craft during said corresponding timespan; and
    - means for determining, for each intermediate time, the position of the craft, on the basis of its position at the previous intermediate time and on the basis of its displacement during the timespan delimited by these two corresponding intermediate times, current and previous.

In a particular embodiment, the device in accordance with the invention comprises, moreover, fifth means for presenting, on a viewing screen, a map which illustrates the environment of the craft and which is furnished with a symbol indicating the position of the craft, as determined by said third and fourth means.

Furthermore, in an advantageous manner:
- said first means comprise a receiver (associated with an antenna) which is mounted on the craft and which cooperates with a standard satellite positioning system; and/or
- said second means comprise at least one inertial platform of said craft.

BRIEF DESCRIPTION OF THE DRAWINGS

The single FIGURE of the appended drawing will ellucidate the manner in which the invention may be embodied. This single FIGURE is the schematic diagram of a device in accordance with the invention.

DETAILED DESCRIPTION OF THE INVENTION

The device 1 in accordance with the invention and schematically represented in the FIGURE is carried on board on a craft (not represented), in particular an aircraft, which is moving on the ground, and it is intended to determine the current ground position of said craft, for example the position on an airport in the case of an aircraft.

Accordingly, said device 1 is of the type comprising:
- means 2 specified below, for emitting position data in a periodic manner; and
- means 3, also specified below, for emitting (in general also in a periodic manner) inertial data of the craft.

According to the invention, said device comprises, moreover:
- means 4 for determining in a standard manner the position of the craft on the basis of position data received, doing so at each emission by said means 2 of such position data. Said position data are emitted for example once a second; and
- means 5 for determining the position of the craft on the basis of inertial data emitted by said means 3, doing so between two successive emissions of position data. Accordingly, the time gap Tc between two successive emissions of position data is divided into a plurality of timespans $\Delta T$ (for example into ten timespans) of the same duration, separated by intermediate times $T_i$, i being an integer.

For this purpose, said means 5 comprise the following integrated means:
- means for determining, at each of said intermediate times $T_i$, an inertial speed on the basis of the inertial data corresponding to said intermediate time;
- means calculating, for each timespan $\Delta T$, the average of the inertial speeds of the two intermediate times delimiting this timespan, and deducing therefrom the ground displacement of the craft during this timespan $\Delta T$; and means for determining, for each current intermediate time (T$_i$ for example), the position of the craft, on the basis of its position at the previous intermediate time (T$_{i-1}$ for example) and on the basis of its displacement during the timespan delimited by these two intermediate times, current and previous (for example T$_i$ and T$_{i-1}$ for the current intermediate time T$_i$).

These various calculations are carried out in a horizontal plane representing the ground so that each position and speed parameter comprises two coordinates.

Said device 1 comprises, moreover, means 6 which are connected by way of links 7 and 8 respectively to said means 4 and 5, and which receive the positions determined by these means 4 and 5 and shape them, if appropriate, before transmitting them to display means 9.

These display means 9 comprise at least one standard viewing screen 10 and are formed so as to present on this viewing screen 10 a map (not represented), which illustrates the environment of the craft and which is furnished with a symbol indicating the current position of the craft, such as transmitted by said means 6. This current position is updated in a periodic manner on the viewing screen 10 with each new generation of a current position value.

In the example of an aircraft, said map can be an airport map showing at least one part of the airport on which the aircraft is situated and is possibly moving, and said symbol is a symbol illustrating the position of said aircraft on said airport.

In a particular embodiment, said means 4, 5 and 6 are grouped together in a central unit 11 which is connected by way of links 12, 13 and 14 respectively to said means 2, to said means 3 and to said display means 9.

Furthermore, in a particular embodiment:
said means 2 comprise a standard receiver 15 which is connected by way of a link 16 to an antenna 17 disposed on the craft, for example on the roof of an aircraft, which cooperates with a standard satellite positioning system, preferably of GPS type (for example Navstar, Galileo, GNSS, GLONASS), and which provides in a periodic manner (generally once a second for in-flight navigation requirements), position data. These position data allow the means 4 to deduce therefrom (periodically) in a standard manner the current position of the craft; and/or
said means 3 comprise at least one standard inertial platform of said craft.

Thus, the device 1 in accordance with the invention determines the position of the craft at a frequency which is higher than the frequency of emission (by the means 2) of the position data, thereby making it possible in particular to satisfy the requirement of a high rate of refreshing of the position of an aircraft within the framework of airport navigation.

The present invention takes account of the fact that the position data (which are data generated by the receiver 15 of the means 2 which cooperate with a standard satellite positioning system) are the available data used which are the most accurate. Also, the device 1 takes into account these position data (by way of the means 4) to determine the position of the craft each time that they are emitted. Moreover, to obtain information about the position of the craft between two successive emissions of such position data, said device 1 takes into account (by way of the means 5) the inertial data generated by the means 3. The craft's position obtained on the basis of said inertial data is admittedly less accurate (in general) than that obtained on the basis of the position data, but it is emitted at a much higher frequency and therefore makes it possible to fill in the absence of information between two emissions of position data.

The present invention applies to any type of craft moving on the ground and comprising means 2, 3 (of arbitrary type) which are capable of generating position data and inertial data. However, a preferred application relates to an aid to the airport navigation of an aircraft, of the aforesaid type.

In a first simplified embodiment, said means 5 determine the position of the craft with the aid of the following expressions:

$$\begin{cases} x_{i+1} = x_i + [(Vx_{i+1} + Vx_i) \cdot dt]/2 \\ y_{i+1} = y_i + [(Vy_{i+1} + Vy_i) \cdot dt]/2 \end{cases}$$

in which:
$x_{i+1}$ and $y_{i+1}$ are the coordinates in a horizontal plane of said position of the craft at a current intermediate time $t_{i+1}$;
$x_i$ and $y_i$ are the coordinates in the horizontal plane of said position of the craft at a previous intermediate time $t_i$;
$Vx_{i+1}$ and $Vy_{i+1}$ are the coordinates in the horizontal plane of the inertial speed of the craft at the intermediate time $t_{i+1}$;
$Vx_i$ and $Vy_i$ are the coordinates in the horizontal plane of the inertial speed of the craft at the intermediate time $t_i$; and
dt is the duration of the timespan $\Delta t$.

To improve the consideration of the displacement of the craft over each timespan $\Delta t$ and take account of the sampling, the means 5 therefore compute an arithmetic average over two inertial speed values taken at the start and at the end of this timespan $\Delta t$.

It is known that the inertial speeds may be marred by an error due, if appropriate, to the slow drift of an inertial platform 3. This error is absolute (that is to say it corresponds to a continuous component). So, to try to circumvent such an error, said means 5 determine the position of the craft with the aid of the following expressions:

$$\begin{cases} x_{i+1} = x_i + [(vx_{i+1} + vx_i) \cdot dt]/2 \\ y_{i+1} = y_i + [(vy_{i+1} + vy_i) \cdot dt]/2 \\ vx_{i+1} = vx_i + (Vx_{i+1} - Vx_i) \\ vy_{i+1} = vy_i + (Vy_{i+1} - Vy_i) \end{cases}$$

in which, in addition to the aforesaid parameters, $vx_i$ and $vy_i$ are calculated speeds which are adjusted in regard to the speed of the reception antenna 17 associated with the receiver 15 of said means 2 which are used to generate the position data. This adjustment is carried out at each emission of said position data.

Preferably, said inertial data correspond directly to inertial speeds Vx and Vy, thereby simplifying the calculation of the position of the craft with the aid of the previous expressions. However, in a particular embodiment, said inertial data can also correspond to accelerations which are used to determine said inertial speeds Vx and Vy. This makes it possible in particular to increase the frequency of calculating the position of the craft, since in a standard manner the accelerations are delivered (generally every 20 ms) at a higher frequency than the inertial speeds (generally delivered every 100 ms). In this case, the accelerations are used to perform an inertial extrapolation between two successive items of inertial speed information, which serves as reference in its turn for the adjustment of this sub-algorithm. The remainder of the algorithm remains unchanged.

In a particular embodiment, at each emission of position data:
- said means 5 determine a first position of the craft with the aid of the position data and inertial data, in the aforesaid manner;
- the means 4 determine, as indicated previously, a second position of the craft on the basis of said position data received from the means 2; and
- said means 6 calculate the deviation between these first and second positions, and deduce therefrom that the craft's position (chosen and used for display) corresponds to:
- said first position, if the deviation thus calculated is greater than or equal to a first predetermined value (and is less than a second predetermined value); and
- a said second position, if said deviation is less than said first predetermined value.

The latter embodiment makes it possible to monitor and, if appropriate, to filter possible errors of position data, of limited duration (predetermined limit).

It is known that in the case of means 2 of GPS type, the receiver 15 is capable of providing standard values HDOP, HFOM and HIL which represent accuracy information and give real-time indications about the quality of the location information (position data) emitted. So, the device 1 in accordance with the invention comprises, moreover, means 18 which are for example integrated within the central unit 11 and which receive accuracy information of the aforesaid type and determine a potential position error of the craft on the basis of this accuracy information, by combining it with the known accuracy of the cartographic data used by the display means 9. Said means 18 can transmit this potential error to said display means 9 in order that they highlight on said map, around the symbol illustrating the current position of the craft, a zone which illustrates said potential error of the craft, that is to say a zone in which the craft is situated with a certain probability.

Knowing the current scale used by the display means 9, the projection used for representing the map and the characteristics of the screen 10, it is possible to deduce therefrom a potential error of display on the screen 10 (in pixels) with a certain probability. As a function of the error (and possibly of its associated probability), it is possible to envisage means (not represented) for forewarning the pilot (for example in the form of audible and/or visual alerts) of a risk of inconsistency between the accuracy of the position of the craft and the detail of the map. These alerts can go from a simple message addressed to the pilot to prohibition to use certain display scales for the display means 9.

The invention claimed is:

1. A method for determining a ground position of a craft using position data emitted in a periodic manner and inertial data:
   A/ at each emission of position data, using the position data to determine the position of the craft; and
   B/ between two successive emissions of position data, taking into account said inertial data, and:
   a) dividing the time gap between these two successive emissions into a plurality of timespans of the same duration, delimited by intermediate times; and
   d) for each intermediate time, determining the position of the craft with the aid of said inertial data, wherein:
   the following operations are moreover performed:
   B/ b) at each of said intermediate times, determining an inertial speed of the craft based on the corresponding inertial data; and
   B/ c) for each timespan, calculating the average of the inertial speeds of the two intermediate times delimiting the timespan, and the ground displacement of the craft during said timespan is deduced therefrom; and
   in step d), for each intermediate time, determining the position of the craft based on its position at the previous intermediate time and based on its displacement during the timespan delimited by the two corresponding intermediate times, current and previous,
   wherein in steps B/c) and B/d), the position of the craft is determined with the aid of the following expressions:

$$\begin{cases} x_{i+1} = x_i + [(vx_{i+1} + vx_i) \cdot dt]/2 \\ y_{i+1} = [(vy_{i+1} + vy_i) \cdot dt]/2 \\ vx_{i+1} = vx_i + (Vx_{i+1} - Vx_i) \\ vy_{i+1} = vy_i + (Vy_{i+1} - Vy_i) \end{cases}$$

in which:
$x_{i+1}$ and $y_{i+1}$ are the coordinates in a horizontal plane of said position of the craft at an intermediate time $t_{i+1}$;
$x_i$ and $y_i$ are the coordinates in the horizontal plane of said position of the craft at a previous intermediate time $t_i$;
$Vx_{i+1}$ and $Vy_{i+1}$ are the coordinates in the horizontal plane of the inertial speed of the craft at the intermediate time $t_{i+1}$;
$Vx_i$ and $Vy_i$ are the coordinates in the horizontal plane of the inertial speed of the craft at the intermediate time $t_i$;
dt is the duration of the timespan; and
$vx_i$ and $vy_i$ are calculated speeds which are adjusted in regard to the speed of a reception antenna used to generate the position data, at each emission of said position data.

2. The method as claimed in claim 1, wherein in steps B/c) and B/d), the position of the craft is determined with the aid of the following expressions:

$$\begin{cases} x_{i+1} = x_i + [(Vx_{i+1} + Vx_i) \cdot dt]/2 \\ y_{i+1} = y_i + [(Vy_{i+1} + Vy_i) \cdot dt]/2 \end{cases}$$

in which:
$x_{i+1}$ and $y_{i+1}$ are the coordinates in a horizontal plane of said position of the craft at an intermediate time $t_{i+1}$;
$x_i$ and $y_i$ are the coordinates in the horizontal plane of said position of the craft at a previous intermediate time $t_i$;
$Vx_{i+1}$ and $Vy_{i+1}$ are the coordinates in the horizontal plane of the inertial speed of the craft at the intermediate time $t_{i+1}$;
$Vx_i$ and $Vy_i$ are the coordinates in the horizontal plane of the inertial speed of the craft at the intermediate time $t_i$; and
dt is the duration of the timespan.

3. The method as claimed in claim 1, wherein said inertial data correspond directly to inertial speeds.

4. The method as claimed in claim 1, wherein said inertial data correspond to accelerations making it possible to determine said inertial speeds.

5. The method as claimed in claim 1, wherein at each emission of position data:
   determining a first position of the craft based on the inertial data, in accordance with step B/;
   calculating the deviation between the first position and a second position obtained with aid of said emitted position data; and the position of the craft is given by:
said first position, if the deviation thus calculated is greater than or equal to a first predetermined value and is less than a second predetermined value; and
said second position, if said deviation is less than said first predetermined value.

6. The method as claimed in claim 1, wherein in a following step C/, a map illustrating the environment of the craft is displayed on a viewing screen, which map is furnished with a symbol indicating the position of said craft as determined in steps A/ and B/d).

7. The method as claimed in claim 6, wherein:
accuracy information relating to the accuracy of said position data are collected;
a potential position error of the craft is determined on the basis of this accuracy information; and
a zone illustrating said potential position error of the craft is highlighted on said map around said symbol.

8. The method as claimed in claim 1, wherein said position data are data generated by a receiver which is mounted on the craft and which cooperates with a satellite positioning system.

9. The method as claimed in claim 1, wherein said inertial data are data generated by an inertial platform of the craft.

10. A method for determining a ground position of a craft using position data emitted in a periodic manner and inertial data:
A/ at each emission of position data, using the position data to determine the position of the craft; and
B/ between two successive emissions of position data, taking into account said inertial data, and:
a) dividing the time gap between these two successive emissions into a plurality of timespans of the same duration, delimited by intermediate times; and
d) for each intermediate time, determining the position of the craft with the aid of said inertial data, wherein:
the following operations are moreover performed:
B/ b) at each of said intermediate times, determining an inertial speed of the craft based on the corresponding inertial data; and
B/ c) for each timespan, calculating the average of the inertial speeds of the two intermediate times delimiting the timespan, and the ground displacement of the craft during said timespan is deduced therefrom; and
in step d), for each intermediate time, determining the position of the craft based on its position at the previous intermediate time and based on its displacement during the timespan delimited by the two corresponding intermediate times, current and previous,
wherein in steps B/c) and B/d), the position of the craft is determined with the aid of the following expressions:

$$\begin{cases} x_{i+1} = x_i + [(vx_{i+1} + vx_i) \cdot dt]/2 \\ y_{i+1} = [(vy_{i+1} + vy_i) \cdot dt]/2 \\ vx_{i+1} = vx_i + (Vx_{i+1} - Vx_i) \\ vy_{i+1} = vy_i + (Vy_{i+1} - Vy_i) \end{cases}$$

in which:
$x_{i+1}$ and $y_{i+1}$ are the coordinates in a horizontal plane of said position of the craft at an intermediate time $t_i$;
$x_i$ and $y_i$ are the coordinates in the horizontal plane of said position of the craft at a previous intermediate time $t_i$;
$Vx_{i+1}$ and $Vy_{i+1}$ are the coordinates in the horizontal plane of the inertial speed of the craft at the intermediate time $t_{i+1}$;
$Vx_i$ and $Vy_i$ are the coordinates in the horizontal plane of the inertial speed of the craft at the intermediate time $t_i$;
dt is the duration of the timespan; and
$vx_i$ and $vy_i$ are calculated speeds which are adjusted in regard to the speed of a reception antenna used to generate the position data at each emission of said position data,
wherein said position data are data generated by a receiver which is mounted on the craft and which cooperates with a satellite positioning system, and
wherein said inertial data are data generated by an inertial platform of the craft.

\* \* \* \* \*